(12) United States Patent
Boutami et al.

(10) Patent No.: US 8,598,528 B2
(45) Date of Patent: Dec. 3, 2013

(54) INFRARED DETECTOR BASED ON SUSPENDED BOLOMETRIC MICRO-PLATES

(75) Inventors: Salim Boutami, Grenoble (FR); Agnès Arnaud, St Jean le Vieux (FR); Geoffroy Dumont, Paris (FR); Pierre Imperinetti, Seyssins (FR); Alexandre Mary, Chatellerault (FR); Stéphane Pocas, Grenoble (FR); Wilfried Rabaud, Moirans (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 272 days.

(21) Appl. No.: 13/238,410

(22) Filed: Sep. 21, 2011

(65) Prior Publication Data

US 2012/0104258 A1 May 3, 2012

(30) Foreign Application Priority Data

Nov. 3, 2010 (FR) ...................................... 10 59026

(51) Int. Cl.
*G01J 5/02* (2006.01)
(52) U.S. Cl.
USPC ....................................... 250/349; 250/338.1
(58) Field of Classification Search
USPC ............. 250/339.02, 349, 338.1, 332, 339.01
See application file for complete search history.

(56) References Cited

U.S. PATENT DOCUMENTS

2008/0185521 A1    8/2008  Hollingsworth

FOREIGN PATENT DOCUMENTS

FR          2752299 A1    2/1998
WO       2008018082 A2    2/2008

OTHER PUBLICATIONS

Search Report for French Patent Application No. 1059026.

*Primary Examiner* — David Porta
*Assistant Examiner* — Gisselle Gutierrez
(74) *Attorney, Agent, or Firm* — Heslin Rothenberg Farley & Mesiti P.C.

(57) ABSTRACT

A bolometric array detector for detecting electromagnetic radiation in a predetermined range of infrared wavelengths includes a substrate; an array of bolometric micro-plates for detecting the radiation suspended above the substrate by support arms; and metallic reflectors formed on the substrate underneath the micro-plates to reflect that portion of the radiation which has passed through said micro-plates without being absorbed by the latter. For each micro-plate, a corresponding reflector includes a first part located underneath the micro-plate which extends as a second part not positioned underneath the micro-plate. At least the second part has surface texturing in a repeating pattern for coupling a portion of incident radiation on the second part to a guided wave that propagates towards the first part of the reflector positioned underneath micro-plate.

16 Claims, 5 Drawing Sheets

INFRARED DETECTOR BASED ON SUSPENDED BOLOMETRIC MICRO-PLATES

CROSS REFERENCE TO RELATED APPLICATIONS

This application claims priority of French application no. 1059026 filed on Nov. 3, 2010, the entire contents of which is hereby incorporated by reference herein.

FIELD OF THE INVENTION

The invention relates to the field of infrared bolometric detection and, more especially, the field of bolometric detection using an array of micro-plates that are suspended above a substrate.

DESCRIPTION OF THE PRIOR ART

It is frequently acknowledged that infrared detection, i.e. detection in the wavelength range from 0.75 µm to 1000 µm, is a technological field that is fraught with particular problems. In fact, every object emits in the infrared spectrum as soon as its temperature exceeds 0° K. Thus, if an infrared detector is not cooled, the components that surround the sensitive elements (substrates, connectors and wiring, packages, optics, etc.) emit significant infrared radiation which is added to the radiation originating from the scene that one is attempting to detect. This unwanted component can be very considerable and sometimes constitutes more than 99% of the total signal produced by the detection elements at a temperature of 300° K. This unwanted component is commonly referred to as "thermal noise" or "common mode noise".

Consequently and in contrast to other types of detection, especially detection in the visible spectrum, there is a need to provide architectures and operating principles that are capable of effectively managing this common mode noise. To achieve this, the first high-sensitivity infrared detectors were cooled to extremely low temperatures of around a hundred degrees Kelvin or even several degrees Kelvin in order to minimize common mode noise.

Also, there are two distinct classes of infrared detectors, namely "quantum" detectors and "thermal" detectors, especially thermal bolometric detectors. It is also well known that the physical principles used by these two types of detection are fundamentally different and that each entail their own problems.

In the case of quantum detectors, a semiconductor is used to produce electron-hole pairs due to the effect of photon absorption in the infrared spectrum with the charge carriers thus created being collected via electrodes which are usually combined with a PN type junction.

In contrast, in the case of bolometric detectors, an absorbent material that is selected for its ability to convert the power of the infrared incident flux into heat is used. This material, or a second material that is in contact with the first material, is also used to convert the heat produced into a variation of an electrical characteristic, generally speaking a variation in electrical resistance. This variation of the electrical characteristic is then measured.

One particular bolometric detector architecture has been devised in order to manage common mode noise, namely a detector that comprises an array of bolometric micro-plates that are suspended above a so-called "readout" substrate by means of support and thermal isolation arms.

As known in itself, this architecture is specifically provided to thermally isolate the bolometric elements from the substrate, which is the main source of common mode noise because it is located extremely close to them. This produces, firstly, a significant gain in terms of sensitivity and, secondly, this architecture also makes it possible to do away with the need for cooling down to extremely low temperatures.

Such an architecture has been the subject of numerous studies regarding the sensitivity of bolometric micro-plates. In particular, if the thickness of the micro-plates is reduced, they let through a significant portion of the radiation that is to be detected. In order to improve the sensitivity of the micro-plates, a metallic reflector which allows the radiation to pass through the micro-plates twice is usually provided underneath each micro-plate. In addition, the distance between a micro-plate and its associated metallic reflector has also been optimized. In particular, these elements are separated by an air or vacuum gap measuring $\lambda/4$, where $\lambda$ is the wavelength that is to be detected, in order to produce a quarter-wave space and thus obtain resonance.

Such a structure is described, for example, in document FR 2 752 299.

Although an architecture based on suspended micro-plates has many advantages, especially the possibility of being used without being cooled down to extremely low temperatures, the presence of the support arms of the bolometric micro-plates makes it impossible to achieve a satisfactory fill factor using current fabrication techniques.

For example, producing detectors with square micro-plates having a side dimension of 12 µm that are absorbent around $\lambda=10$ µm requires a square substrate surface area having a side dimension at least 25 µm for each micro-plate. The useful surface area of an array of micro-plates dedicated to detection therefore accounts for no more than 25% of the total surface area of the array.

SUMMARY OF THE INVENTION

The object of the present invention is to resolve the above-mentioned problem of the reduced useful surface area in bolometric detectors based on suspended micro-plates by proposing an architecture that increases this useful surface area virtually without the ratio between the surface area of the micro-plates and the total surface area of the array being modified.

To achieve this, the object of the invention is a bolometric array detector for detecting electromagnetic radiation in a predetermined range of infrared wavelengths comprising:
  a substrate;
  an array of bolometric micro-plates for detecting said radiation that are suspended above the substrate by support arms; and
  metallic reflectors formed on the substrate underneath the micro-plates in order to reflect that portion of said radiation which has passed through said micro-plates without being absorbed by the latter.

According to the invention, for each micro-plate:
  the reflector comprises a first part that is positioned directly below the micro-plate, said first part extending as a second part that is not positioned underneath the micro-plate; and
  at least that second part of the reflector which is not positioned underneath the micro-plate has a surface texture with a repeating pattern capable of coupling a portion of said radiation that is incident on said second part to a guided wave that propagates towards that first part of the reflector which is positioned underneath the micro-plate.

In other words, a portion of the surface area of the substrate that is not positioned underneath the micro-plates is provided with a repeating pattern that guides the radiation which it receives underneath the micro-plates by using surface plasmon excitation. The portion of the reflector positioned underneath the micro-plates then reflects this portion of the radiation towards the actual micro-plates and also reflects the radiation that passed through them. Thus, that second part of the substrate which is not positioned underneath the micro-plates is used for detection purposes and this increases the useful detection surface area without increasing the dimensions of the micro-plates.

In the following description and as usually accepted in this field, the term "pixel", when it refers to the detection array, denotes all the hardware elements that produce an output signal relating to an image element as well as the surface dedicated to these elements.

In one embodiment, the texturing is produced over a thickness of metal that is at least greater than the skin depth of the metal that constitutes the metal layer for the particular wavelength range. This way, the reflector remains opaque to the radiation. For instance, if texturing is produced by etching a metal layer, the etching does not extend all the way and stops at a metal thickness that exceeds the skin depth.

In one embodiment, the texturing comprises slits that define closed concentric contours, especially concentric circles or squares. This way, detection by the texturing is insensitive to the polarization of the incident radiation.

Alternatively, the texturing comprises repeated parallel slits in a single direction so that detection by the texturing is sensitive to a single polarization.

In one embodiment of the invention, the reflectors are formed in a metal layer that covers the substrate at least underneath the entire surface area of the array of micro-plates and the reflectors are individualized by means of areas of the metal layer that define a break in the periodicity of the texturing of the reflectors.

Such a break makes it possible to individualize the reflectors and avoid so-called crosstalk between adjacent pixels, i.e. a pixel detecting radiation that should normally have been detected by an adjacent pixel. This achieves good pixel separation.

In addition, the method of fabricating the reflectors is simple because they can be realized simply by depositing a solid sheet of a metal layer on the substrate followed by lithography using a single mask to produce the individual reflectors.

In one embodiment, the period P of the periodic texturing pattern is equal to or less than $\lambda/n$, where $\lambda$ is a wavelength in the wavelength range that is to be detected and n is the refractive index of the medium that separates the micro-plate from the reflector. Said period of the pattern preferably substantially equals $$\frac{\lambda}{3 \times n}.$$

In one embodiment, the depth h of the texturing is equal to or less than $$\frac{\lambda}{5 \times n}$$

and preferably substantially equals $$\frac{\lambda}{10 \times n}.$$

Absorption of the radiation by the texturing is reduced in this way. In particular, if the texturing consists of slits, such a thickness prevents the radiation from being trapped and therefore absorbed in them.

Advantageously, the recessed portion of the texturing represents less than 50% of the total surface area of the texturing. In particular, the texturing consists of periodic slits having a length e that is chosen so that $$0.05 < \frac{e}{P} < 0.5,$$

where P the period of the texturing pattern. This encourages guided mode excitation with low radiant losses.

In one embodiment, the average height L between the micro-plate and the associated reflector is equal to or less than $$\frac{\lambda}{4 \times n};$$

this encourages coupling between the mode that is guided by the texturing and the micro-plate by using evanescent-type coupling between the guided mode and the micro-plate.

In one embodiment, that part of the reflector which is positioned underneath the micro-plate is not textured and this prevents absorption of radiation by that part of the reflector that is located underneath the micro-plate.

BRIEF DESCRIPTION OF THE DRAWINGS

The present invention will be made more readily understandable by the following description which is given merely by way of example and relates to the accompanying drawings in which identical references denote identical or analogous components and in which.

DESCRIPTION OF THE PREFERRED EMBODIMENTS

Figure 1:
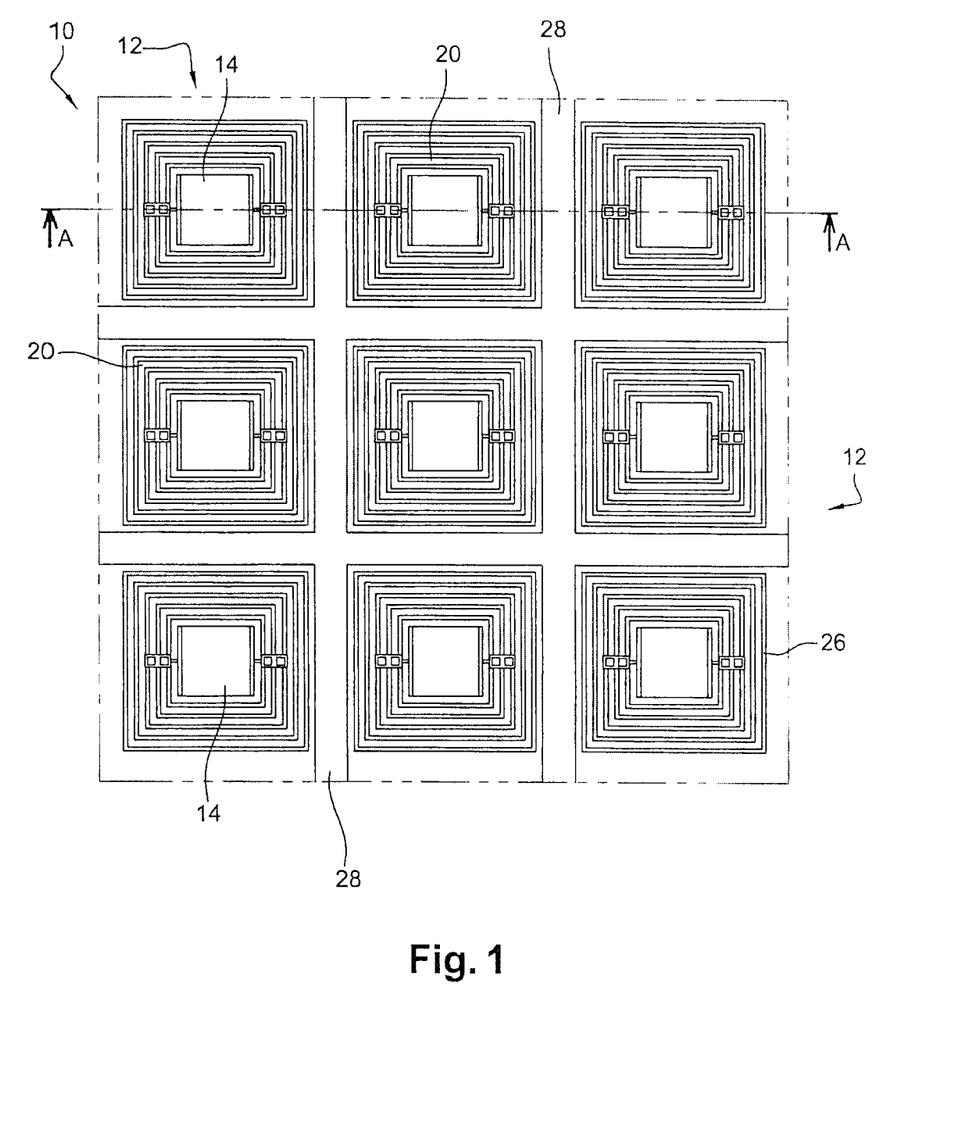
FIG. 1 is a schematic top view of a three bolometric pixel by three bolometric pixel array according to the invention.
Figure 2:
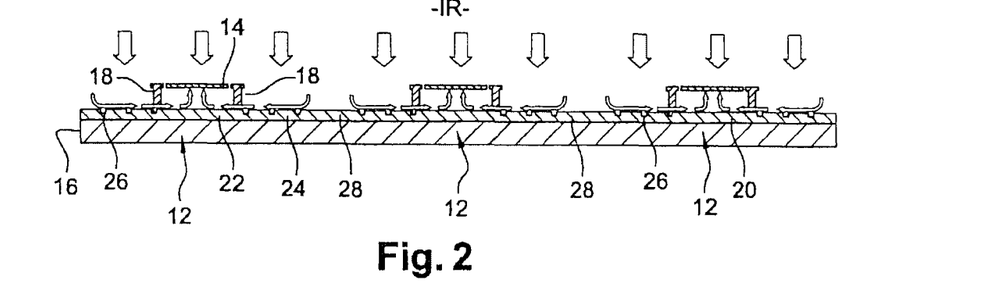
FIG. 2 is a schematic cross-sectional view of the array in FIG. 1 along line A-A.

FIGS. 1 and 2 show, by way of example, a bolometric detector array 10 comprising three pixels by three pixels.

Each pixel 12 comprises a bolometric micro-plate 14, suspended above a substrate 16 by support and thermal isolation arms 18, which makes it possible to detect incident IR electromagnetic radiation in an infrared wavelength range from 0.75 μm to 1000 μm.

As is known in itself, micro-plate 14 warms up due to the effect of the incident IR radiation and its electrical resistance varies as a function of the increase in its temperature The same material can be used to implement both these functions, TiN for instance is suitable for detecting wavelengths in the mid infrared range.

The support and thermal isolation arms 18 consist mostly of a material with a low thermal conductance which contains an electrical conductor element that makes it possible to subject micro-plate 14 to a bias voltage and/or bias current in order to measure its electrical resistance. Arms 18 are electrically connected to a readout circuit provided in substrate 16 which controls the biasing of micro-plate 14.

In the context of the invention, the structure and the operation of bolometric micro-plates 14 are relatively unimportant, any type of micro-plate can be envisaged, for example the micro-plate described in Document FR 2 752 299. The important fact to grasp is that the invention applies to any bolometric array in which the surface area of the micro-plates is reduced relative to the surface area of the pixels.

Each pixel 12 also comprises a flat reflector 20 formed by a layer of metal deposited on substrate 16. Reflector 20 comprises a first part 22 located underneath micro-plate 14 and a second part 24 located around micro-plate 14. In the following text, part 22 is called the "central part" of the reflector and part 24 is called the "peripheral part" of the reflector.

The central part 22 of the reflector is preferably solid, i.e. not textured, and its primary function is to reflect the portion of radiation that has passed through said micro-plate without being absorbed, thus making it possible for the radiation to pass through the micro-plate at least twice or even obtain resonance if the distance between micro-plate 14 and central part 22 is adjusted to form a quarter-wave space for instance.

The peripheral part 24 of reflector 20 has surface texturing with a periodic pattern, e.g. parallel slits 26 having a rectangular cross-section etched in the thickness of reflector 20 and forming concentric squares.

As shown by the arrows in FIG. 2, the periodic pattern is designed to couple the incident radiation on peripheral part 24 to a guided wave which is also referred to as a surface "plasmon" wave. The guided wave then propagates towards central part 22 of reflector 20 which reflects it towards micro-plate 14 by evanescent coupling so that it can be absorbed.

The periodic pattern that surrounds micro-plate 14 thus increases the useful surface area dedicated to detecting radiation "virtually" and hence increases the sensitivity of the detector without micro-plate 14 itself being modified thereby.

Figure 3:
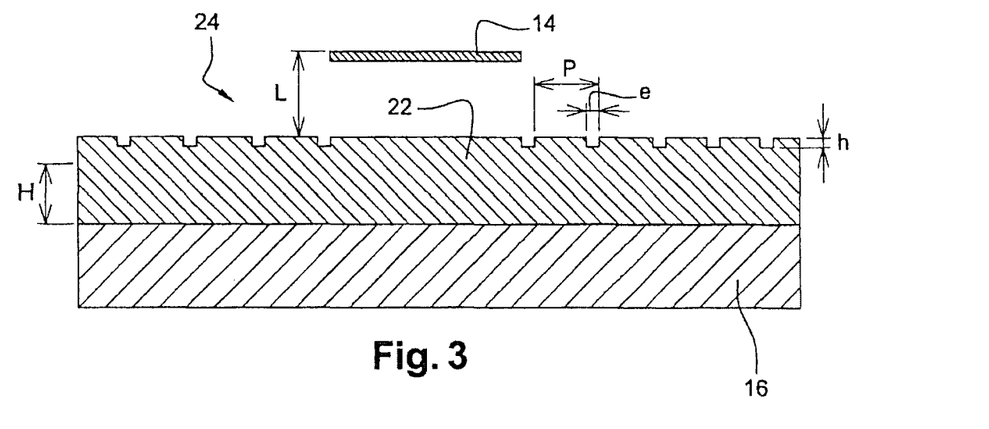
FIG. 3 is a simplified schematic cross-sectional view of a pixel of the array in FIG. 1.

In the simplified cross-sectional view in FIG. 3, the periodic pattern of peripheral part 24 has a period P that is equal to or less than λ/n, where λ is a wavelength in the range of wavelengths that are to be detected and n is the refraction index of the medium that separates micro-plate 14 from reflector 20 (usually air). This makes it possible to excite a surface plasmon wave having a wavelength λ. Higher periods P produce diffraction which adversely affects wave coupling quality until coupling eventually disappears as period P increases.

Advantageously, period P substantially equals $$\frac{\lambda}{3 \times n}.$$

In fact, inventors have observed that coupling is optimal when period P assumes this value.

Advantageously, micro-plate 14 is located distance L away from central part 22, this distance being equal to or less than $$\frac{\lambda}{4 \times n}.$$

This produces coupling between the guided wave coupled by peripheral part 24 of the reflector and absorbent micro-plate 14 and, more especially, evanescent coupling which allows efficient "reflection" of the energy recovered by the coupling towards micro-plate 14 provided by peripheral part 24.

Advantageously, the recessed portion of the texturing represents less than 50% of the total surface area of the texturing. As far as slits 26 are concerned, this means that their width e is selected so that $$\frac{e}{P} < 0.5.$$

This way, excitation of the guided wave is obtained without any significant radiant losses. Also, width e is advantageously selected so that $$\frac{e}{P} > 0.05.$$

Above such a value, coupling is actually very weak and therefore relatively unattractive because the reflector behaves like a quasi-continuous metal film.

Advantageously, the depth h of the texturing is equal to or less than $$\frac{\lambda}{5 \times n}$$

and preferably substantially equals $$\frac{\lambda}{10 \times n}.$$

The reduced depth of the recessed portions of the periodic pattern thus prevent radiation from remaining trapped in these portions and consequently being absorbed by the material from which they are formed.

Advantageously, a solid thickness H of reflector 20, greater than the skin depth of the metallic material of reflector 20 at wavelength λ, is present underneath the texturing so as to make peripheral part 24 opaque to the radiation, thus preventing it from being transmitted towards substrate 16.

Figure 4A:
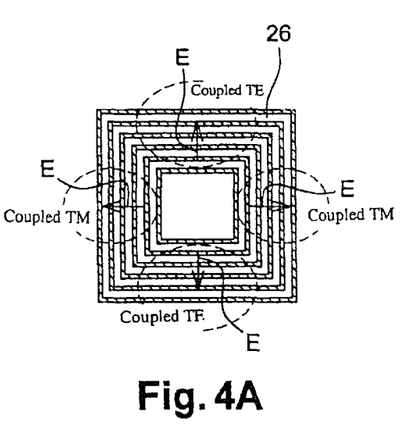
FIGS. 4A and 4B are schematic views of pixels with peripheral periodic patterns in the form of concentric squares and circles respectively.

In the embodiment described above, the periodic pattern consists of slits 26 forming concentric squares. This way, the coupling produced by peripheral part 24 is insensitive to the polarization of the incident radiation. In FIG. 4A, the portions of slits 26 forming two opposite sides of the squares are sensitive to one polarization, e.g. polarization TE, and the portions of slits 26 forming the two other opposite sides of the squares are sensitive to perpendicular polarization, in this example polarization TM. This layout makes it possible to couple 50% of polarization TE and 50% of polarization TM.

Figure 4B:
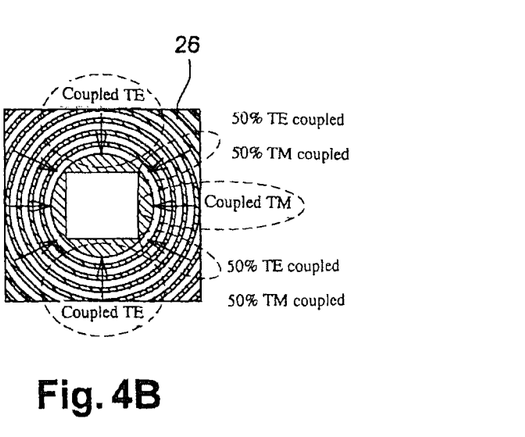

Nevertheless, other shaped patterns are also possible. For example, in order to make coupling insensitive to the polarization of the incident radiation, slits 26 are circular and concentric, as shown in FIG. 4B. In particular, the absence of any corners makes it easier to fabricate squares by using lithography.

Alternatively, some applications may require the detection of a single type of polarization, in which case the periodic pattern of peripheral part 24 is made up of parallel slits running along a single axis.

Advantageously, the peripheral parts 24 of two adjacent pixels are separated by a region that creates a break in the repeating texturing patterns. For example, in the case of square slits 26, the region that creates a break in the repeated patterns is a solid part 28 having a relative width that is at least 5% greater than the width of the solid parts of peripheral parts 24, or a slit having a relative width that is at least 5% greater than the width of the slits of peripheral parts 24.

Thanks to such a break area, the incident radiation on a peripheral part 24 of a reflector can only propagate towards central part 22 of that reflector, thus preventing crosstalk due to coupling. Reflectors 20 are thus effectively individualized.

An embodiment in which central part 22 is solid is described above. Alternatively, the central part is textured in the same way as peripheral part 24, with the texturing therefore covering the entire surface area of the substrate that is dedicated to one pixel.

Figure 5:
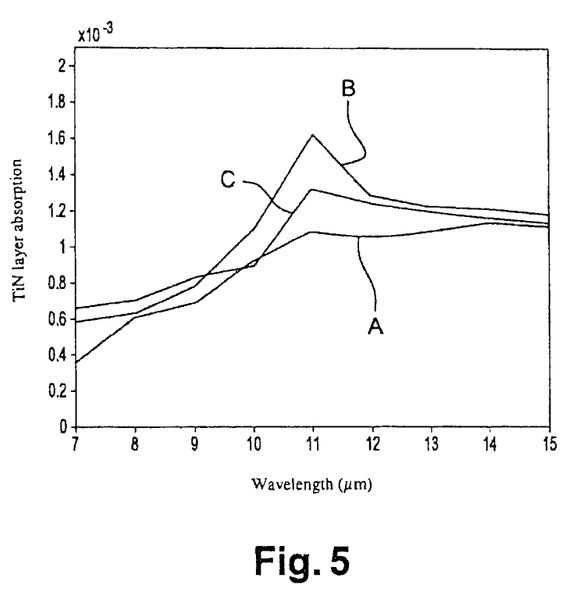
FIG. 5 is a graph showing the absorption curves of two detectors according to the invention and of a detector according to the prior art.

FIG. 5 illustrates the gain in absorption provided by the textured peripheral part of the reflector according to the invention. More especially, absorption was measured as a function of the wavelength of the incident radiation for different detector layouts comprising square micro-plates made of TiN having a side dimension of 12 μm for a square pixel surface area having a side dimension of 25 μm. The detector is tuned for a wavelength of 11 μm.

The first detector layout is equivalent to that of the prior art. Each micro-plate is placed above a solid metallic reflector 2.5 μm from the latter. The reflector has no textured peripheral part. The absorption of this first setup is shown by curve "A".

The second detector layout is equivalent to that described in relation to FIGS. 1 to 3. Each micro-plate 14 is located 2.5 μm from reflector 20. The peripheral part 24 of reflector 20 covers the entire surface area of substrate 16 dedicated to pixel 12, except central part 22, and slits 26 have a periodicity P equal to 3.4 μm, a width e equal to 0.6 μm and a thickness $\overline{h}$ equal to 0.7 μm. The absorption of this second setup is shown by curve "B".

The third detector layout differs from the second layout in that the texturing covers the entire surface area of substrate 16 dedicated to pixel 12, including central part 22 of reflector 20. Slits 26 have the same geometry as that in the second layout and the absorption of this third setup is shown by curve "C".

As evidenced by FIG. 5, a very considerable gain in absorption is obtained thanks to the invention, this gain being in excess of 50% for the second layout at λ=11 μm compared with the prior art.

The gain in absorption obtained using the third layout, although greater than 20% compared with the prior art, is not as high as that obtained using the second layout. A solid central part 22 is therefore the preferred option.

A method for fabricating a detector according to the invention is described below, making reference to FIGS. 6 to 15.

Figure 6:
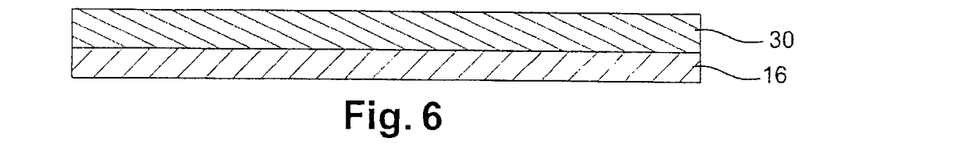
FIGS. 6 to 15 are schematic cross-sectional views showing an embodiment of a detector according to the invention.

The method starts by depositing a metal layer 30 over the entire surface area of a substrate 16 above which the array of suspended micro-plates 14 is intended to be fabricated (FIG. 6). Layer 30, from which reflectors 20 will subsequently be fabricated, is, for example, a layer of aluminum, titanium, titanium nitride, copper or tungsten. Its thickness equals the total heights H and h associated with the texturing of peripheral parts 24 of reflectors 20 (FIG. 3).

Figure 7:
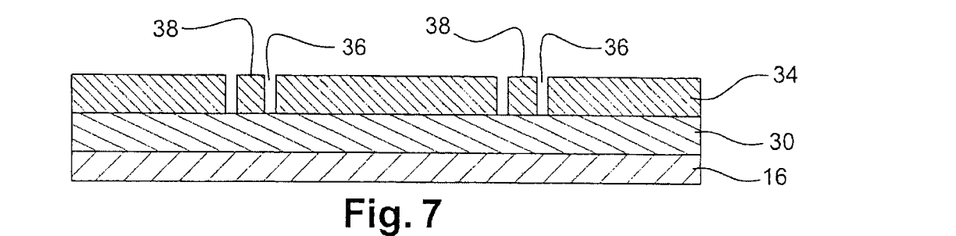

The method continues by producing a lithography mask. This mask is produced in a layer of photosensitive resin 34 through which cuts 36 which delimit islands 38 above the locations intended for support and thermal isolation arms 18 of micro-plates 14 are made (FIG. 7).

Figure 8:
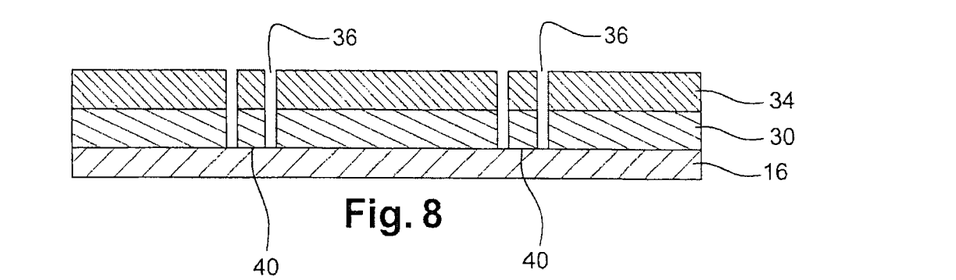

Metal layer 30 is then etched, preferably by dry etching, through cuts 36 as far as substrate 16 in order to delimit metallic bump contacts 40 that will subsequently accommodate support arms 18 (FIG. 8). Contacts 40 are thus used as connection contacts for arms 18 and are electrically isolated from the rest of metal layer 30 in which reflectors 20 are fabricated.

Figure 9:
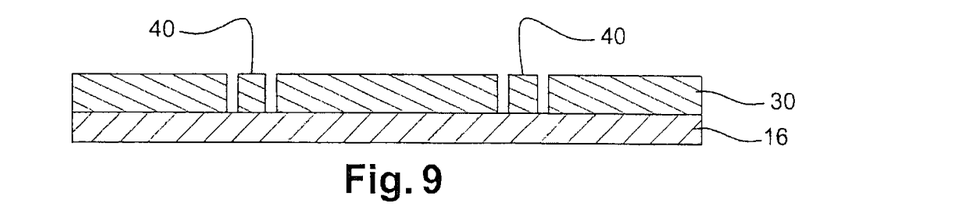

Resin layer 34 is removed conventionally, for instance by using dry or wet stripping (FIG. 9).

Figure 10:
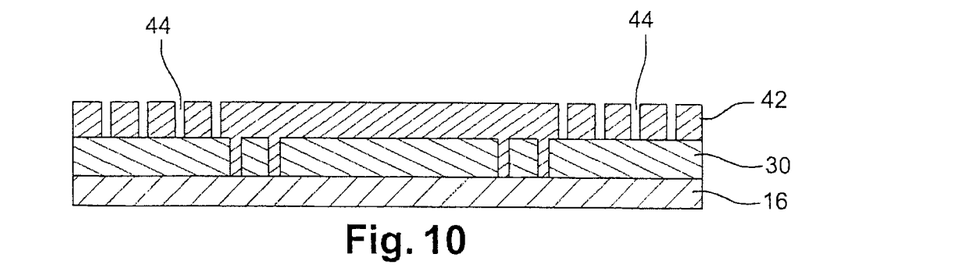

The method then continues by conventionally producing a lithography mask in a photosensitive resin layer 42 deposited on metal layer 30 and through which cuts 44 corresponding to the desired texturing for reflectors 20 are made, in the example shown this is only texturing of peripheral parts 24 (FIG. 10). Obviously, if the application so demands, cuts can be provided in lithography mask 42 over those portions 46 of metal layer 30 that are intended to become the central parts 22 of reflectors 20.

Figure 11:
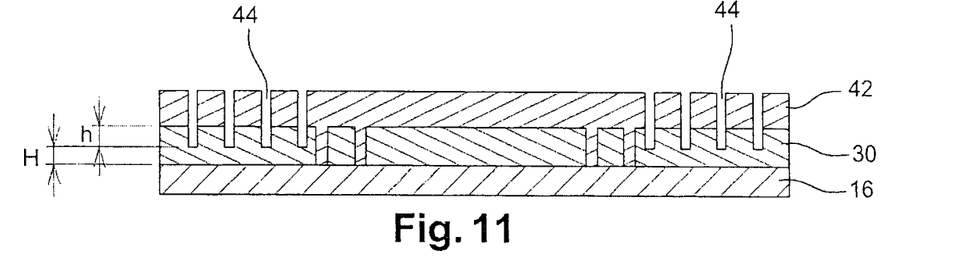
Figure 12:
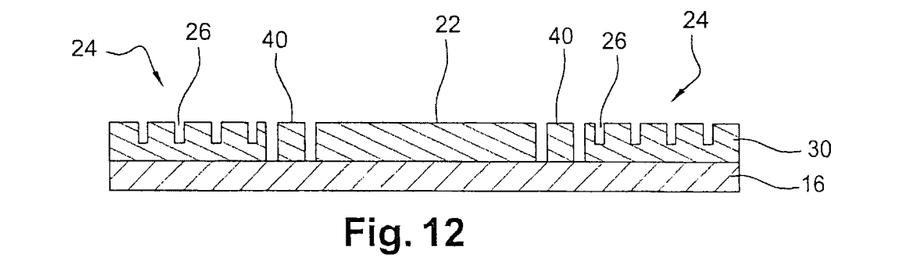
Figure 13:
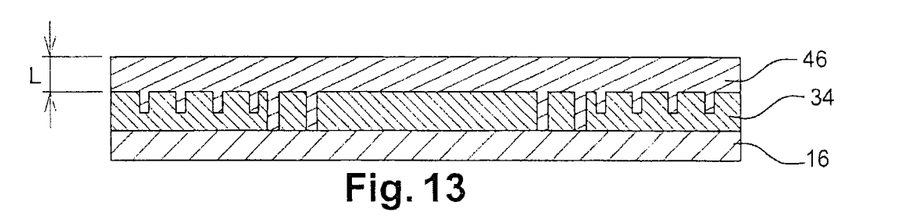

Metal layer 30 is then partially etched through cuts 44 of mask 42 to the desired depth h (FIG. 3) of the texturing of reflectors 20 so as to fabricate the reflectors (FIG. 11). This partial etching is preferably performed by dry etching using, for example, a chlorinated, brominated or fluorinated chemical, but may also be performed by wet etching, for instance by using an acidic or alkaline chemical. Dry etching is preferred insofar as it offers an etch rate that is more linear than that of wet etching and this makes it possible to obtain more easily controllable etching.

Lithography mask 42 is then removed, for example by wet or dry stripping (FIG. 12), then a sacrificial layer 46 is deposited on the assembly (FIG. 13), with this layer having a thickness equal to L (FIG. 3) above metal layer 30.

Figure 14:
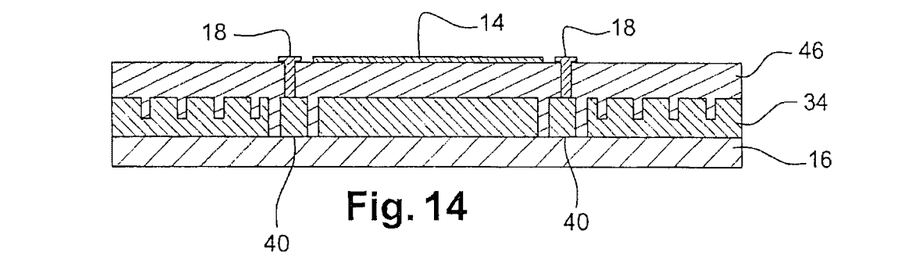

Bolometric micro-plates 14 are then formed on sacrificial layer 46 above central parts 22 and support and thermal isolation arms 18 are produced through sacrificial layer 46 and above contacts 40 in a manner that is known in itself (FIG. 14).

Figure 15:
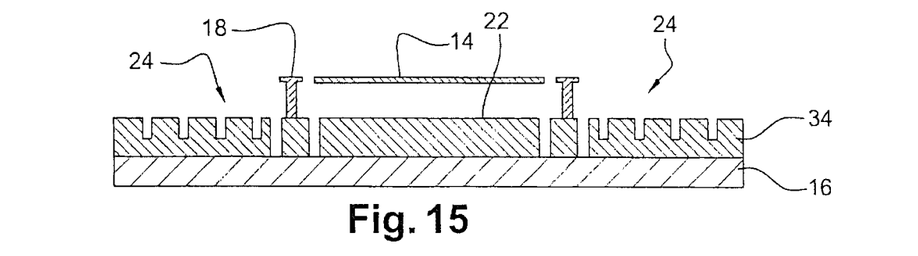

The method is then completed by removing sacrificial layer 46 (FIG. 15).

The invention achieves:
- a significant increase in the sensitivity of a bolometric detector with suspended micro-plates because the detection surface area is enlarged;
- the possibility of performing multispectral imaging. In fact, periodic structuring couples one wavelength preferentially, for example a wavelength around λ=11 μm in the case illustrated in FIG. 5. Modifying the periodicity from one pixel to another, therefore produces an array of pixels in which each pixel accentuates a specific wavelength; and
- the possibility of accentuating one polarization in particular.

The invention claimed is:

1. A bolometric array detector for detecting electromagnetic radiation in a predetermined range of infrared wavelengths comprising:
    a substrate;
    an array of bolometric micro-plates for detecting said radiation, said bolometric micro-plates being suspended above the substrate by support arms; and
    metallic reflectors formed on the substrate and underneath the bolometric micro-plates in order to reflect that portion of said radiation which has passed through said micro-plates without being absorbed by the micro-plates;

wherein for each bolometric micro-plate, a corresponding metallic reflector comprises a first part located directly below the micro-plate, said first part extending by a second part not positioned underneath said micro-plate; said second part having a surface texturing in a repeating pattern coupling a portion of incident radiation on said second part to a guided wave that propagates towards the first part of the reflector positioned underneath the micro-plate.

2. The bolometric array detector as claimed in claim 1, wherein the metallic reflector comprises a metal layer and the surface texturing is produced over a thickness of the metal layer that is at least greater than a skin depth of the metal layer for the predetermined range of infrared wavelengths.

3. The bolometric array detector as claimed in claim 1, wherein the surface texturing comprises slits that define closed concentric contours.

4. The bolometric array detector as claimed in claim 1, wherein the surface texturing comprises periodic parallel slits in a single direction.

5. The bolometric array detector as claimed in claim 1, wherein the metallic reflectors are formed in a metal layer that covers the substrate at least underneath an entire surface area of the array of the bolometric micro-plates, and wherein the metallic reflectors are individualized by areas of metal layer that define a break in periodicity of the surface texturing of reflectors.

6. The bolometric array detector as claimed in claim 2, wherein period P of the repeating pattern of the surface texturing is less than $$\frac{\lambda}{n}$$

where λ is a wavelength in the predetermined range of wavelengths that is to be detected and n is a refraction index of a medium that separates each micro-plate from the metallic reflector.

7. The bolometric array detector as claimed in claim 6, wherein skin depth h of the surface texturing is equal to or less than $$\frac{\lambda}{5 \times n}.$$

8. The bolometric array detector as claimed in claim 6, wherein a recessed portion of the surface texturing represents less than 50% of a total surface area of the surface texturing.

9. The bolometric array detector as claimed in claim 7, wherein a recessed portion of the surface texturing represents less than 50% of a total surface area of the surface texturing.

10. The bolometric array detector as claimed in claim 8, wherein the surface texturing comprises periodic slits having a width e which is selected so that $$0.05 < \frac{e}{P} < 0.5.$$

11. The bolometric array detector as claimed in claim 9, wherein the surface texturing comprises periodic slits having a width e which is selected so that $$0.05 < \frac{e}{P} < 0.5.$$

12. The bolometric array detector as claimed in claim 6, wherein average height L between a micro-plate and the corresponding reflector is equal to or less than $$\frac{\lambda}{4 \times n}.$$

13. The bolometric array detector as claimed in claim 1, wherein the first part of the metallic reflector located underneath the micro-plate is not textured.

14. The bolometric array detector as claimed in claim 3, wherein the surface texturing comprises slits that define concentric circles or squares.

15. The bolometric array detector as claimed in claim 6, wherein the period P of the repeating pattern of the surface texturing is substantially equal to $$\frac{\lambda}{3 \times n}.$$

16. The bolometric array detector as claimed in claim 7, wherein the skin depth h of the surface texturing is substantially equal to $$\frac{\lambda}{10 \times n}.$$

* * * * *